3,592,741
METHOD FOR ANALYSIS OF UREA
Leonard A. Hughes, 1526 Mountain Blvd.,
Oakland, Calif. 94611
No Drawing. Continuation-in-part of application Ser. No. 523,023, Jan. 26, 1966. This application June 5, 1968, Ser. No. 734,530
The portion of the term of the patent subsequent to Nov. 5, 1985, has been disclaimed
Int. Cl. G01n 31/14
U.S. Cl. 195—103.5  3 Claims

ABSTRACT OF THE DISCLOSURE

A method for determining urea comprising the incubation of the sample containing urea in a buffered solution containing urease and nitroprusside, followed by the addition of a source of phenate ion and a source of hypochlorite ion in an alkaline medium to produce a color reaction.

---

This application is a continuation-in-part of patent application Ser. No. 523,023, filed Jan. 26, 1966, Pat. No. 3,409,508.

This invention relates to an improved method for analysis of urea in biological fluids such as blood serum or plasma or urine.

The usual methods for analysis of urea are:

(1) Nesslerization.
(2) Reaction with diacetyl compounds (these methods (1) and (2) involve boiling and complicated analytical procedure and are not adaptable to rapid analysis).
(3) Employing the specific enzyme urease to convert urea to carbon dioxide and ammonia, and determining the liberated ammonia by one of several methods, the most sensitive being the Berthelot reaction, first described in 1859. In this reaction, ammonia and phenol in the presence of hypochlorite produce a blue color with intensity proportional to the amount of ammonia present. This third method especially when used with the Berthelot reaction, is an improvement over the prior methods because of its specificity for urea, because the sensitivity of the test requires only small samples, and because it avoids boiling or poisonous reagents.

Some improvements and changes have been made in the third method. Thus, M. M. Murray in Biochem. J. 19:294, 1925, first reported than an alkali metal nitroferricyanide (also called sodium nitroprusside) could be used as a catalyst in the Berthelot reaction to speed the conversion of ammonia to indophenol, the color end point. Since then Chaney and Marbach, Clin. Chem. 8:131, 1962, have reported a modified form of this method (cf. U.S. Reissue Pat. No. 26,125) that is currently rather widely used. However, their two principal reagents—a buffered urease solution and a mixture of nitroferricyanide and phenol—are quite unstable in their working solutions. Hence, they have to be supplied as solids and mixed shortly before use. Their method is thus not suitable for use by individual physicians and is suitable only for well-equipped laboratories, and even there has serious disadvantages because it is relatively slow.

Conventional measuring methods have been cumbersome, slow, and difficult for all but technically trained people. Also, no prior- art method enables the rapid processing of large numbers of samples.

One object of the present invention is to provide accurate determination of urea, espceially in biological fluids, from stable reagents which require no reconstitution for actual use.

Another object is to provide a more accurate and more rapid method for urea determination.

Another object is to provide a procedure for urea determination capable of easy and efficient performance by people with little, if any, technical training in laboratory procedures and with a few pieces af equipment.

In accordance with this invention, it has been found that the nitroprusside catalyst can be added to the incubation mixture containing the urease and buffer without affecting the ability of the enzyme to convert the urea to carbon dioxide and ammonia. Thus this invention relates to a method for determining the presence of urea in a fluid comprising the incubation of a buffered solution of said fluid, urease and nitroferricyanide catalyst, followed by addition to the mixture of a source of phenate ion and hypochlorite ion to produce color development in an alkaline medium.

Although the urease and nitroferricyanide catalyst can be added to the incubation mixture in the form of a buffered aqueous solutioned of the two substances, where such a solution is to be prepared hours in advance of the incubation it is desirable to stabilize the solution with a lower molecular weight glycol.

The reagents used in this invention are: (1) (a) urease, (b) nitroferricyanide catalyst and (c) a lower molecular weight glycol if an equeous solution of the urease and nitroprusside is to be used and the solution allowed to stand for hours prior to use in the test, (2) a source of phenate ion and (3) a source of hypochlorite ion.

The reagent comprising the mixture of urease and nitroferricyanide catalyst in glycol provides stability, so that the reagent can be kept for months and the preparation is ready for use without further dilution. Also, the mixture may be freezer-stored without solidification and kept that way indefinitely without deterioration. Nitroferricyanide is unstable when in contact with phenol and water, so one advantage of the reagent is that the nitroferricyanide and phenol can be kept separate until the actual tests are run. In this reagent, the nitroferricyanide catalyst surprisingly in no way interferes with the enzyme activity of the urease; in fact, the urease and nitroferricyanide keep at least as well together, when stabilized by glycol, as they do separately.

The other two reagents are not new in themselves. The second reagent, a source of phenate ion has been used previously in ammonia determination tests. The source of phenate ion may either by phenol; an alkali metal phenate, mixtures thereof, solutions thereof, and solutions of mixtures thereof. A convenient source of phenate ion to use is a dilute aqueous solution of an alkali metal phenate. It may readily be made by mixing phenol with an alkali metal hydroxide, suitably sodium hydroxide in approximately molecular equivalent quantities in water, the final concentration preferably being about 3% by weight alkali metal phenate. A particularly stable reagent for use in an aqueous solution of phenol in which little or not alkali metal phenate is present.

The third reagent a source of hypochlorite ion can be either aqueous hypochlorous acid, an alkali metal hypochlorite or a solution thereof, or an aqueous mixture of hypochlorous acid and an alkali metal hypochlorite. A convenient source of hypochlorite ion is aqueous sodium hypochlorite, in a concentration of about 3% by weight. It is also stable and easily kept. The reagent may, of course, be more or less dilute.

Since, as is known in the art, the color reaction resulting from the contacting of phenol and ammonia in the presece of hypochlorite requires the presence of alkali, either the basicity of the second and third reagents when combined should be sufficient to provide the required alkalinity or otherwise sufficient base should be added to the reaction mixture prior to color development. Thus in the situation where the second reagent is phenol, sufficient base, suitably as alkali metal hydroxide, should be present in the third reagent or should be added to the reaction mixture to afford the required alkalinity.

The lower molecular weight glycols for use in the first reagent are those which are those water soluble alkanediols which are liquid at room temperature. The most conventient glycols for use are those with the lowest viscosities, e.g. ethylene glycol and 1,3-propanediol. The amount of glycol used is a stabilizing amount. Although the minimum amount of glycol for stabilizing the mixture can be as low as 10% percent by volume in the mixture, amounts in the range of about 40 to 50% by volume are particularly suitable. To avoid degradation of the enzyme, perhaps the result of impurities in the glycol, it is preferred to use no more than 60% glycol by volume.

As suggested previously it has also been found that, even in the absence of a stabilizing substance, the nitroferricyanide catalyst can be included in a buffered incubation mixture comprising urease and a biological fluid containing urea, without affecting the ability of the urease to convert the urea to ammonia. Thus after incubation the ammonia released can be determined using a source of phenate ion and a source of hypochlorite ion without thereafter having to add the nitroferricyanide catalyst.

The process of the invention includes other novel features forming significant parts of the present invention. Extremely small quantities of unknown samples are used, typically 20 microliters. Ordinarily, the measurement and manipulation of such small samples would be difficult, but in this invention measurement of the sample is accomplished by filling a microcapillary tube known to contain a precise volume. Further, the contents of the microcapillary tube containing the serum are washed out by capillary action and surface tension, by using a larger-diameter second capillary tube containing the measured amount of enzyme reagent or are washed out by flushing the capillary with another source of enzyme reagent such as a squeeze bottle, the contents whereof are forced by squeezing into the serum microcapillary tube. For further refinement, the above manipulation results in delivery of the serum and enzyme reagent into a calibrated cuvette, so that after the initial reaction is complete (by incubation at either room temperature or a higher temperature), the second reagent is added to a calibration mark on the cuvette. After that or at the same time, the color reagent e.g. hypochlorite is added, a single drop being sufficient where hypochlorite solution of sufficent concentration is used, and exact measurement of that reagent not being critical. Further incubation is done, and after the reaction is complete, final dilution by water, if necessary is made to a second calibration mark. The cuvette may then be inserted into a colorimeter to determine optical density of the colored solution for a quantitative reading.

The practice of the invention is further illustrated by reference to the following detailed examples. In these examples percentages (%) refer to percent by weight.

EXAMPLE 1

(A) Preparation of reagents (1) A stabilized buffered urease enzyme and nitroferricyanide reagent can be prepared by dissolving 2400 Sumner units of urease (one unit being defined as that amount of enzyme which will produce 1 mg. of ammonia nitrogen from urea in 5 minutes at pH 7 at 30° C.) in 630 ml. of 0.08 N phosphate buffer, pH 6.5. Ethylene glycol (or other glycol) is added to make a volume of one liter. Then 0.8 gm. of alkali metal (e.g., sodium) nitroferricyanide is added. The solution will keep for months and will keep indefinitely in a freezer.

(2) Sodium phenate: 31 gm. of phenol 88% in water is added 875 ml. of water and followed by 125 ml. of 10% aqueous sodium hydroxide. The solution is stable.

(3) Sodium hypochlorite: 600 ml. of 5% aqueous solution can be diluted to one liter with water. The solution is stable.

(4) Urea standard: 129 gm. urea is dissolved in one liter of a saturated aqueous solution of benzoic acid. (This is equivalent to 60 mg. of urea nitrogen per 100 ml.) This also is stable.

(B) Diagnostic test (1) A control sample of reagent 4 above, the urea standard, is measured by a microcapillary tube—e.g., 20 microliters in a tube 40 mm. long. Exactly the same size samples of blood serum or plasma or of diluted urine are measured in other indentical microcapillary tubes.

(2) The urease enzyme (reagent (1) above) is measured into a series of microcapillary tubes—e.g., each holding 125 microliters, 90 mm. long. Alternatively, an identical solution, except that water is used instead of the glycol to make a volume of one liter, can be used.

(3) With the lower end of each sample microcapillary tube against the wall of a calibrated cuvette, then the lower end of an enzyme microcapillary tube is placed in contact with the upper end of the sample tube. Surface tension and capillary action drain both microcapillary tubes and their contents flow to the bottom of the cuvette. A series of cuvettes, one for each sample, are in this way supplied with these initial ingredients.

(4) The mixture is incubated—typically 20 minutes at 37° C. or 6 minutes at 55° C., or 40 minutes at room temperature.

(5) Sodium phenate solution (reagent (2) above) is added to a first calibration mark on each cuvette (about 1.3 ml.).

(6) One drop of sodium hydrochlorite (reagent (3) above) is added to each cuvette.

(7) The mixture is incubated—typically 15 minutes at 37° C. or 4 minutes at 55° C., or 30 minutes at room temperature.

(8) The resulting incubated solution has an intense blue color. It is diluted with water to a second mark (approx. 8.0 ml.) on the cuvette to bring optical density within a suitable range.

(9) By processing the control, containing a known concentration of urea, simultaneously with the unknown samples in a colorimeter simple calculations give the actual values for the unknown samples.

EXAMPLE 2

(A) Preparation of reagents (1) A stabilized buffered urease enzyme and nitroferricyanide reagent is prepared as outlined in Example 1, part A (1).

(2) Sodium phenate/phenol solution: sufficient water is added to a mixture of 8 grams of phenol and about 400 milligrams sodium hydroxide to bring the volume to one liter. The solution is stable.

(3) Alkaline sodium hypochlorite: a solution of 800 ml. of 5% aqueous sodium hypochlorite and 100 grams of sodium hydroxide is diluted to 1 liter with water. This solution is stable.

(4) Urea standard: 1.29 grams urea is dissolved in an aqueous solution containing 0.15% methyl p-hydroxybenzoate and 20% ethylene glycol.

(B) Diagnostic test (1) A control sample of reagent for above, the urea standard, is measured by a microcapillary tube e.g. 20 microliters in a tube 40 millimeters long. Exactly the same size samples of blood serum or plasma or of diluted urine are measured in other identical microcapillary tubes.

(2) The urease enzyme (reagent (1) above) is placed in a squeeze bottle, suitable made of polyethylene. Alternatively, an identical solution except that water is used instead of the glycol to make a volume of one liter, can be used.

(3) With the lower end of each sample microcapillary tube against the wall of a calibrated cuvette, approximately 1.3 ml. of the enzyme reagent is used to wash out the contents of that microcapillary tube by squeezing the enzyme solution into the upper end of the tube. The pressure of the solution, in addition to surface tension and capillary action drain the microcapillary tube and its contents flow to the bottom of the cuvette. The amount of enzyme reagent used for the washing is not critical so long as sufficient enzyme is added to allow the reaction to go to completion. A series of cuvettes, one for each sample, are in this way supplied with these initial ingredients.

(4) The mixture is incubated-typically 20 minutes at 37° C. or 6 minutes at 55° C. or 40 minutes at room temperature.

(5) The sodium phenate/phenol solution (reagent (2) above) is added to a first calibration mark on each cuvette (about 3 to 4 ml. added).

(6) Two drops of the alkaline sodium hypochlorite solution (reagent (3) above) is added to each cuvette.

(7) The mixture is incubated—typically 15 minutes at 37° C. or 4 minutes at 55° C. or 30 minutes at room temperature.

(8) The resulting incubated solution has an intense blue color. The optical density is then read with a colorimeter.

(9) By processing the control sample containing a known concentration of urea, simultaneously with the unknown samples in a colorimeter, simple calculations give the actual values for the unknown samples.

What is claimed is:

1. In a method for determining urea in aqueous fluids, said method utilizing the reaction of urea present in said fluid with an effective amount of urease to release ammonia and detecting said ammonia by measuring the color produced by reacting said ammonia with phenate ion and hypochlorite ion in the presence of an alkali metal nitroferricyanide, the improvement which comprises incubating said aqueous fluid with an aqueous solution consisting essentially of a mixture of urease and alkali metal nitroferricyanide prior to contacting with phenate ion and hypochlorite ion.

2. A method as in claim 1 wherein the alkali metal nitroferricyanide is sodium nitroferricyanide.

3. A method as in claim 1 wherein the color developed is determined in a colorimeter.

References Cited

UNITED STATES PATENTS 3,119,751  1/1964  Chaney _____ 195—103.5

ALVIN E. TANENHOLTZ, Primary Examiner